March 19, 1929.   O. E. BARTHEL   1,705,705
MOTOR VEHICLE CHASSIS
Filed Jan. 13, 1922   2 Sheets-Sheet 2
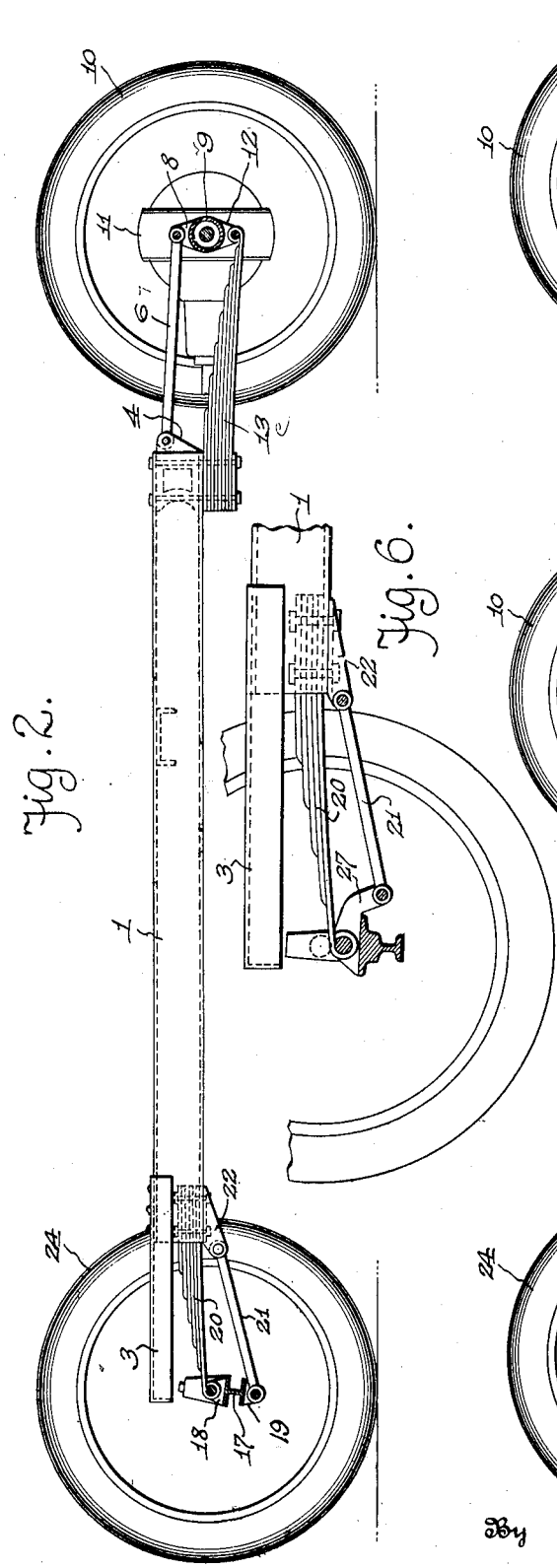
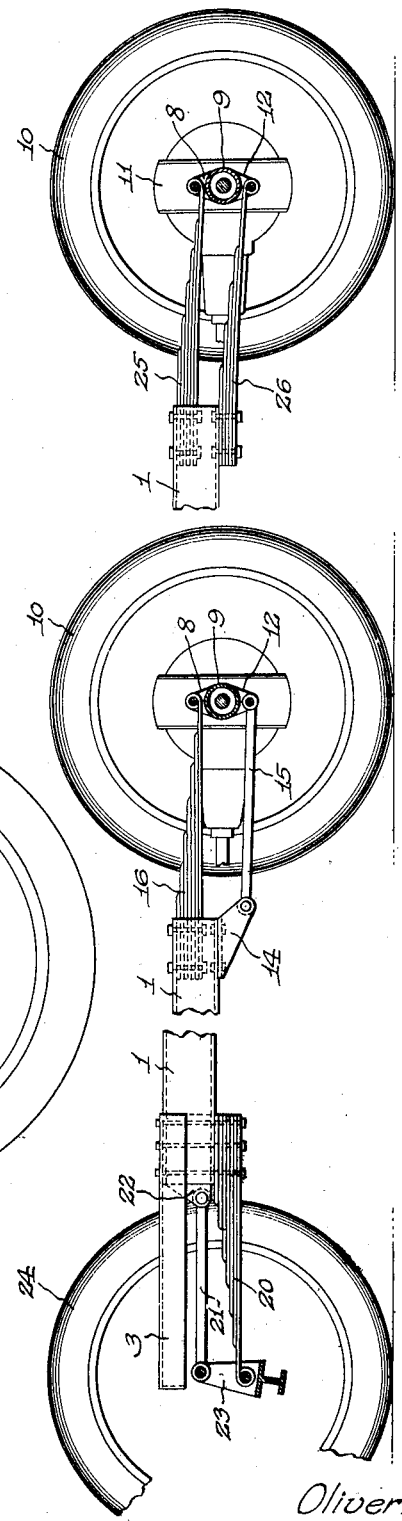
Inventor
Oliver E. Barthel,
By
Attorneys Patented Mar. 19, 1929.

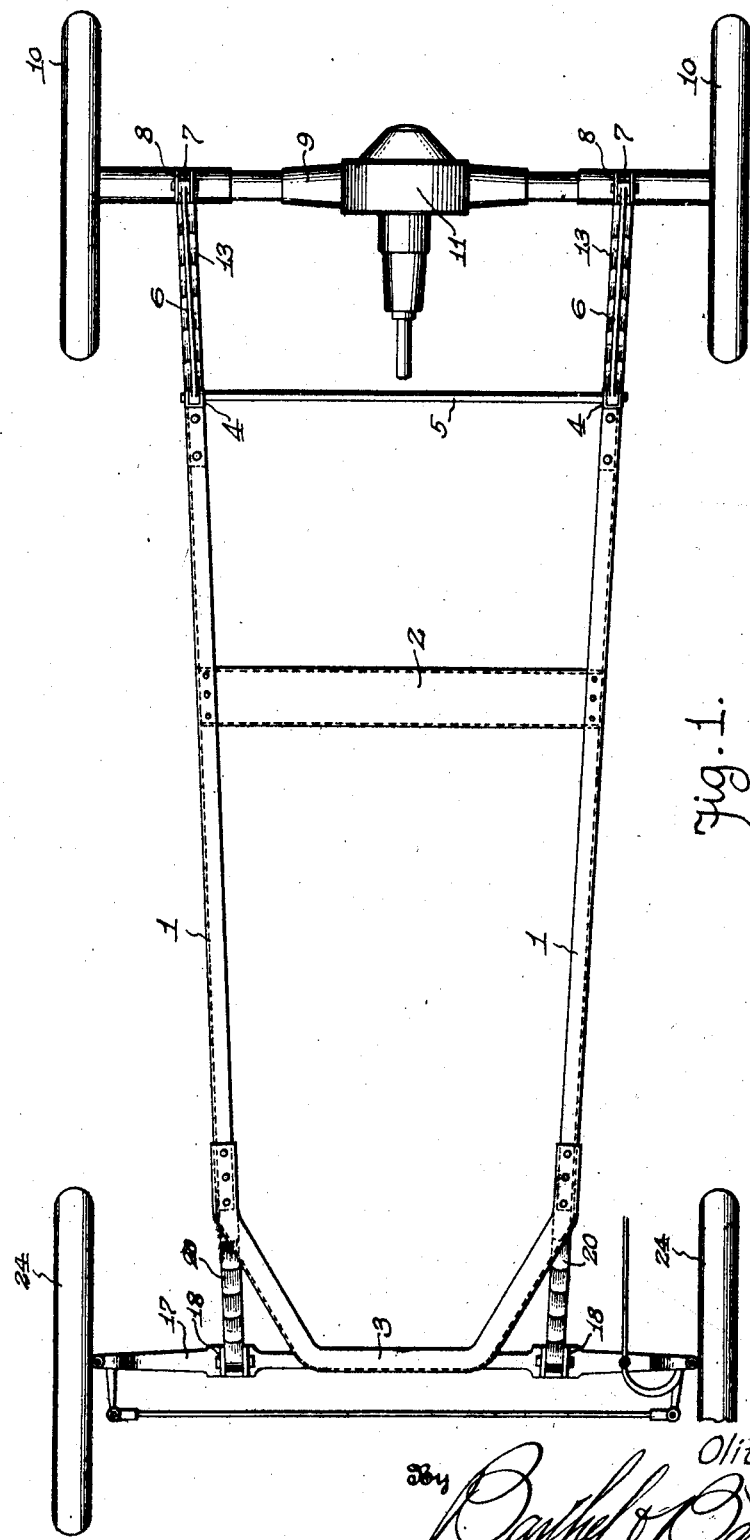

1,705,705

UNITED STATES PATENT OFFICE.

OLIVER E. BARTHEL, OF DETROIT, MICHIGAN.

MOTOR-VEHICLE CHASSIS.

Application filed January 13, 1922. Serial No. 528,956.

This invention relates to a motor vehicle chassis, and has special reference to a frame and its articulation with the front and rear axle assemblies of a motor vehicle.

My invention aims to provide a novel arrangement of tension and compression members by which a frame may be connected to the front and rear axle assemblies of a vehicle, so that the frame will be safely supported with a degree of resiliency which will insure comfort to the occupants of a vehicle body on the frame.

My invention further aims to provide a four point suspension for a vehicle frame relative to axles wherein quarter elliptic, semi-elliptic or cantilever springs are employed for yieldably supporting the frame relative to the axles, and tension or coupling members are utilized for preventing excessive canting of the axles relative to the frame and excessive flexure of the frame supporting springs.

The novel construction entering into my invention will be hereinafter described and then claimed, and reference will now be had to the drawings, wherein Figure 1 is a plan of a vehicle chassis in accordance with my invention;

Fig. 2 is a side elevation of the same;

Fig. 3 is a side elevation of a portion of a chassis, illustrating a re-arrangement of parts of the front axle assembly shown in Figs. 1 and 2;

Fig. 4 is a similar view illustrating a re-arrangement of parts of the rear axle assembly shown in Figs. 1 and 2;

Fig. 5 is an elevation of a portion of the chassis showing the end of the frame supported by two tension members, and Fig. 6 is a detail view illustrating another connection between an axle assembly and the tension and compression members.

The frame of the vehicle tapers inwardly from the rear end thereof to the forward end and is consequently of less width at the forward end than the rear end, said frame being composed of two channel members 1 which may be connected, intermediate the ends thereof, by a transverse channel member 2. The forward ends of the channel members 1 may be connected by a front vehicle frame 3 and this front frame may cooperate with the members 1 and 2 in supporting the power plant and other parts of a motor vehicle.

Suitably connected to the rear ends of the channel members 1 are brackets 4 and mounted in said brackets is a transversely disposed tie or spacing rod 5 on the ends of which are pivotally mounted rigid tension members 6, preferably in the form of rods or bars which extend rearwardly and have the rear ends thereof pivotally mounted, as at 7, between upstanding lugs or brackets 8 carried by a rear axle casing or housing 9 forming part of the rear axle assembly, which includes rear wheels 10 and a differential 11.

By reference to Fig. 2 it will be noted that the brackets 4 are on the ends of the side channel members 1 and extend rearwardly from said members, while the lugs or brackets 8 of the rear axle assembly extend upwardly from the housing or casing. Opposed to the sets of lugs or brackets 8 are depending lugs or brackets 12, and connected to these lugs or brackets are compression members 13, preferably in the form of a quarter elliptic of cantilever springs which have large and rigid ends suitably connected to the lower faces of the side channel members 1. This arrangement, however, may be reversed, as shown in Fig. 4, where brackets 14 are connected to the lower faces of the side channel members 1 and tension members 15 extend rearwardly from said brackets and are connected to the lugs or brackets 12 of the rear axle assembly. The lugs or brackets 8 are connected by compression members 16 to the rear ends of the side channel members 1, and said compression members may have the front rigid ends thereof set in the side channel members. In either instance, excessive canting of the rear axle housing or casing 9 is prevented by the tension members 6 and 15, without interfering with the cushioning of the rear ends of a vehicle frame by the compression members 13 and 16. The compression members 13 or 16 afford a two point suspension for the comparatively short vehicle frame, at the rear axle assembly, and a "kick up" of the rear end of the frame will be prevented by a vehicle body mounted thereon and overhanging the rear axle assembly.

Reference will now be had to the front axle assembly wherein an axle 17, as shown in Figs. 1 and 2, has upwardly extending sets of lugs or brackets 18 and depending sets of lugs or brackets 19. The lugs or brackets 18 are connected by compression members 20 to the forward ends of the side channel member 1, and the lugs or brackets 19 are connected by tension members 21, to brackets 22 on the lower faces of the side channel members 1. This arrangement may be reversed, as brought out in Fig. 3, by providing larger lugs or brackets 23 to which the sets of compression and tension members may be connected. As shown in Fig. 2, the front axle assembly includes wheels 24 and the axle 17 is set below the axis of rotation of said wheel, with the forward ends of the compression members 20 approximately in the axis of rotation, and as shown in Fig. 3 the axis of rotation is intermediate the forward ends of the tension and compression members, the forward ends of the tension members being above the axis of rotation and the forward ends of the compression members below the axis of rotation. In either instance excessive canting of the front axle assembly is prevented by the novel manner in which the axle is articulated at the forward end of the vehicle frame. Here again, is a two-point suspension for the vehicle frame, and since the frame is comparatively short its four points of suspension between the front and rear axle assemblies permit of vertical movement of the frame as is necessary in order to cushion a load, and by using the tension members the short frame is coupled to the front and rear axle assemblies, so that for driving purposes there is the necessary connections between the front and rear axles to permit of the latter moving the former.

In Fig. 5 I show how quarter elliptic, semi-elliptic or cantilever springs 25 and 26 may cooperate and serve as tension and compression members having points of attachment above and below the axis of rotation in the axle assembly. In Fig. 6 I show how the points of attachment may be accomplished by a single bracket 27, with one point of attachment below and in the rear of the axle, the other point of attachment above the axle, and both points of attachment below the axis of wheel rotation.

In referring to the tension members 6, 15 and 21, as preventing canting of the axles, I mean excessive canting, to that degree which might result in breaking stresses and strains. Otherwise, the method of articulating the frame and axle assemblies has a distinct advantage. Considering Fig. 2 and assuming the vehicle chassis is driven by power transmitted to the rear axle assembly, depression of the frame flexes the compression members 13 causing the brackets 12 to oscillate or swing rearwardly relative to the axis of wheel rotation, and since such rotation is in a counterclockwise direction the axle assembly has a tendency to turn in a similar direction, thus advancing the wheels 10 so that momentarily there will be a gain, resulting in an impetus, which due to the location of the brackets 8 causes the tension members 6 to push the frame ahead. This is felt at the front axle assembly, where depression of the frame has also caused the front axle to turn in the direction of wheel rotation, and the combined actions result in a driving gain or "pick-up" which is beneficial. This is brought about without sacrificing strength, yet providing a comparatively light weight chassis having the requisite resiliency or flexibility to insure easy riding.

By using quarter elliptic, semi-elliptic or cantilever springs, as compression members or coupling means between a vehicle frame and an axle assembly, I provide considerable resistance against periodic side sway, and the compression and tension members, as well as the spacing or connecting member 5 at the rear end of the frame, will all cooperate in reducing side sway practically to a minimum. Then again, it has been found that when springs have points of attachment to an axle assembly only below or above the axis of wheel rotation that considerable trouble is experienced in connection with braking connections due to centers of oscillation changing, which is brought about by the flattening or elongation of the springs. By connecting my frame to an axle assembly, with points of attachment both above and below the axle assembly the center of oscillation is made more constant so that there is no tendency for a rear axle assembly to break the brake rigging.

While in the drawings there are illustrated the preferred embodiments of my invention, I desire it to be understood that the points of attachment of the compression and tension members relative to an axle assembly, may be changed; that the means which I employ for connecting a frame to an axle assembly may be changed so as to be applicable to frames other than that illustrated, and such other changes as are permissible by the appended claims may be resorted to without departing from the spirit of the invention.

What I claim is:—

1. In a vehicle, the combination of an axle assembly, brackets projecting upwardly from said axle assembly, a chassis, a frame attached to the upper face of said chassis, tension members secured to the lower face of said chassis and pivotally attached to said brackets above said axle assembly, and compression members connected to said chassis between said frame and said tension members and connected to the upper ends of said brackets, said compression members being in a plane above said tension members.

2. The combination called for in claim 1 and means extending through said frame, chassis and compression members connecting all together in substantially the same plane in superposed relation.

3. In a vehicle, the combination of an axle assembly, a bracket extending upwardly from said axle assembly, a chassis, a tension member secured to the lower face of said chassis and pivotally attached to said bracket above said axle assembly, and a compression member pivotally connected to said chassis and bracket and disposed above said tension member.

In testimony whereof I affix my signature.

OLIVER E. BARTHEL.